(12) United States Patent
Seemann et al.

(10) Patent No.: US 11,850,928 B2
(45) Date of Patent: Dec. 26, 2023

(54) ELECTRIC DRIVE AXLE FOR A VEHICLE

(71) Applicants: ZF Friedrichshafen AG, Friedrichshafen (DE); ZF Drivetech (Suzhou) Co. Ltd., Suzhou (CN)

(72) Inventors: Frank Seemann, Euerbach (DE); Paul Lenz, Waldkirchen (DE); Andreas Grossl, Kopfing (AT); Werner Hechberger, Fuerstenzell (DE); Kai Borntraeger, Langenargen (DE); Maik Woerl, Immenstaad (DE); Marco Di Sarno, Osnabrück (DE); Cong Ren, Jiang Sui (CN)

(73) Assignees: ZF FRIEDRICHSHAFEN AG, Friedrichshafen (DE); ZF DRIVETECH (SUZHOU) CO. LTD., Suzhou (CN)

(*) Notice: Subject to any disclaimer, the term of this patent is extended or adjusted under 35 U.S.C. 154(b) by 294 days.

(21) Appl. No.: 17/277,492

(22) PCT Filed: Sep. 13, 2019

(86) PCT No.: PCT/EP2019/074441
§ 371 (c)(1),
(2) Date: Mar. 18, 2021

(87) PCT Pub. No.: WO2020/058103
PCT Pub. Date: Mar. 26, 2020

(65) Prior Publication Data
US 2022/0032755 A1 Feb. 3, 2022

(30) Foreign Application Priority Data
Sep. 19, 2018 (DE) ............ 10 2018 215 924.6

(51) Int. Cl.
*B60K 1/00* (2006.01)
*B60K 1/02* (2006.01)
(Continued)

(52) U.S. Cl.
CPC .............. *B60K 1/02* (2013.01); *B60K 7/0007* (2013.01); *B60K 17/16* (2013.01); *B60K 17/28* (2013.01); *B60K 2025/005* (2013.01)

(58) Field of Classification Search
CPC ........ B60K 1/02; B60K 7/0007; B60K 17/16; B60K 17/28
(Continued)

(56) References Cited

U.S. PATENT DOCUMENTS 7,448,460 B2 * 11/2008 Morrow ................... B60K 6/46
 180/53.61
9,650,032 B2 * 5/2017 Kotloski ................. F16H 3/728
(Continued)

FOREIGN PATENT DOCUMENTS

DE 102010031156 A1 1/2012
DE 112014005133 T5 8/2016
(Continued)

OTHER PUBLICATIONS

International Search Report (English Translation) PCT/EP2019/074441, dated Jan. 22, 2020. (2 pages).
(Continued)

*Primary Examiner* — Hau V Phan
(74) *Attorney, Agent, or Firm* — Dority & Manning, P.A.

(57) ABSTRACT

An electric drive axle for a vehicle includes at least one first electric vehicle drive system (1) for driving at least one vehicle wheel (11, 12) and at least one connection interface (8) for at least one power take-off (PTO). The vehicle drive system (1, 13) is coupled at least to one first double shift element (6) such that, at least in a first engagement position
(Continued)

of the first double shift element (6), the vehicle drive system (1, 13) is drivingly coupled to at least one vehicle wheel (11, 12) and, in a second engagement position of the first double shift element (6), the vehicle drive system (1, 13) is decoupled from the at least one vehicle wheel (11, 12) and is drivingly coupled to the connection interface (8) for the power take-off (PTO). A vehicle with an electric drive axle is also provided.

17 Claims, 5 Drawing Sheets

(51) Int. Cl.
  *B60K 7/00* (2006.01)
  *B60K 17/16* (2006.01)
  *B60K 17/28* (2006.01)
  *B60K 25/00* (2006.01)
(58) Field of Classification Search
  USPC .......................................................... 180/65.6
  See application file for complete search history.

(56) References Cited

U.S. PATENT DOCUMENTS

| | | | |
|---|---|---|---|
| 9,651,120 B2* | 5/2017 | Morrow | F16H 3/727 |
| 10,363,823 B2* | 7/2019 | Li | B60L 8/003 |
| 2003/0116368 A1 | 6/2003 | Winkelman et al. | |
| 2010/0206100 A1* | 8/2010 | Vyas | B60L 15/2045 903/909 |
| 2011/0042155 A1* | 2/2011 | Tarasinski | B60K 6/48 903/902 |
| 2012/0207620 A1 | 8/2012 | Dalum et al. | |
| 2012/0221197 A1* | 8/2012 | Hisada | B60L 1/003 74/665 F |
| 2013/0250916 A1* | 9/2013 | Aoyagi | H04W 36/0022 370/331 |
| 2014/0256493 A1* | 9/2014 | Knoblauch | B60K 17/046 475/151 |
| 2016/0250916 A1 | 9/2016 | Hirano et al. | |
| 2017/0284577 A1* | 10/2017 | Tomlinson | B01F 33/409 |
| 2017/0328453 A1* | 11/2017 | McKinzie | F16H 3/728 |
| 2017/0355373 A1* | 12/2017 | Dalum | F16H 61/0031 |
| 2018/0149247 A1* | 5/2018 | Rekow | F16H 47/04 |

FOREIGN PATENT DOCUMENTS

| | | |
|---|---|---|
| JP | 2006205777 A | 8/2006 |
| WO | WO 2017114422 A1 | 7/2017 |

OTHER PUBLICATIONS

German Search Report DE102018215924.6, dated Jul. 29, 2020. (10 pages).

* cited by examiner

ELECTRIC DRIVE AXLE FOR A VEHICLE

CROSS-REFERENCE TO RELATED APPLICATION

The present application is related and has right of priority to German Patent Application No. 102018215924.6 filed in the German Patent Office on Sep. 19, 2018 and is a nationalization of PCT/EP2019/074441 filed in the European Patent Office on Sep. 13, 2019, both of which are incorporated by reference in their entirety for all purposes.

FIELD OF THE INVENTION

The present invention relates generally to an electric drive axle for a vehicle. Moreover, the invention relates generally to a vehicle with an electric drive axle.

BACKGROUND

Usually, commercial vehicles have an internal combustion engine as the vehicle drive system, with which, additionally, a power take-off is driven. For vehicles equipped with an electric drive axle, the internal combustion engine is omitted as the vehicle drive system. Accordingly, in these types of vehicles, a separate electric motor is usually provided, which drives the power take-off and is operated independently of the electric vehicle drive system. Here, the disadvantage results, that the additional electric motor for driving the power take-off needs a separate power supply and a separate power electronics unit, as well as a separate thermal management. This is costly and requires a considerable amount of additional installation space.

Moreover, publication WO 2017/114422 describes an electric drive axle assembly for a vehicle, which includes a prime mover, a transmission, and a differential, wherein two half-shafts are driven via the differential. Additionally, a power take-off can be driven by the prime mover. Here, the disadvantage results, however, that the power take-off cannot be driven in a manner that is independent of the rotational speed.

SUMMARY OF THE INVENTION

Example aspects of the present invention provide an electric drive axle and a vehicle with the drive axle, in the case of which an optimized operation of a power take-off with the vehicle drive system is implementable.

Therefore, an electric drive axle, or the like, for a vehicle is provided, with at least one first electric vehicle drive system for driving at least one vehicle wheel and with at least one connection interface for a power take-off. In order to implement an optimized operation of at least one power take-off, the vehicle drive system is coupled to at least one first double shift element in such a way that, at least in a first engagement position of the first double shift element, the vehicle drive system is drivingly coupled to at least one vehicle wheel and that, in a second engagement position of the first double shift element, the vehicle drive system is decoupled from the at least one vehicle wheel and is drivingly coupled to the connection interface for the power take-off.

In this way, with the proposed drive axle, a variable-speed operation of the power take-off is made possible in a structurally simple way. Due to the utilization of the double shift element, the further advantage results, that the decoupling from the drive of the vehicle and/or from the vehicle wheels to be driven is implemented without an additional shift element. Therefore, the operation is completely usable for driving the power take-off when the vehicle is stationary.

Example aspects of the invention provide an electric drive axle for a vehicle, with at least one first electric vehicle drive system for driving at least one vehicle wheel and with at least one connection interface for a power take-off. In order to implement an optimized operation of at least one power take-off, the vehicle drive system is coupled to at least one second double shift element in such a way that, in a first engagement position of the second double shift element, a first gear stage is provided for driving at least one vehicle wheel, that, in a second engagement position, a second gear stage is provided for driving the at least one vehicle wheel, and that a single shift element for independently coupling or decoupling the power take-off to or from the vehicle drive system is associated with the input interface for the power take-off.

In this way, the power take-off is engageable and disengageable, independently of the rotational speed, via the single shift element independently of the vehicle drive system. Therefore, the power take-off is also engageable, as necessary, during travel. In addition, the vehicle drive system can be driven in two different gear stages via the second double shift element. Therefore, not only is the operation of the power take-off optimized, but the operation of the vehicle drive system and/or the vehicle is optimized as well.

If the first double shift element is present in the case of the proposed example drive axle, it is particularly advantageous when a neutral position is associated with the first double shift element. Here, the further advantage results that the driven end and/or the vehicle wheels of the vehicle are decoupled from the vehicle drive system and from the power take-off. Therefore, the vehicle can be towed, without negative reactions occurring at the vehicle drive system due to the moving vehicle wheels. This is particularly advantageous, in particular, in the case of permanent-magnet synchronous machines (PSM).

Within the scope of an example refinement of the invention, for example, at least one additional transmission gearing is connected downstream from the vehicle drive system. A permanently engaged or also engageable transmission gearing can be utilized as the transmission gearing. For example, a transmission of a countershaft design, a planetary gear set, or the like, can be utilized as the transmission gearing. As an example, the drive shaft of the vehicle drive system may be connected to a first transmission stage as a pre-ratio, which is then coupled, for example, to further transmission stages of the preferably engageable transmission gearing. Other example embodiments are also conceivable, however, in order to implement a connection of the vehicle drive system and of the power take-off that is as variable as possible.

In the application of an engageable transmission gearing, within the scope of example aspects of the present invention, at least one further shift element, for example, the second double shift element, is associated with the engageable transmission gearing, with which further gear stages are implementable. In this way, in addition to the optimized operation of the power take-off, the mode of operation of the vehicle drive system is also further optimized.

Moreover, a second vehicle drive system may be provided at the proposed example electric drive axle. As a result, for example, the first vehicle drive system can drive the power take-off, while the second vehicle drive system is exclusively utilized, for example, for driving the vehicle wheels.

If, for example, a first vehicle drive system and a second vehicle drive system are provided in the case of the electric drive axle, within the scope of an example refinement of the invention, the first and second vehicle drive systems are coupled to each other via a summation gear, or the like, in order to sum the drive powers, and so the drive power is summed, if necessary, upstream from the transmission gearing. The summation gear can be coupled, for example, via the engageable or permanently engaged transmission gearing, to an output differential in order to drive the first vehicle wheel and the second vehicle wheel.

Alternatively, the first vehicle drive system is coupleable to the first vehicle wheel and the second vehicle drive system is drivingly coupleable to the second vehicle wheel. In this way, a wheel-specific drive is implemented in the case of the electric drive axle.

One further example aspect of the present invention relates to a vehicle with the above-described electric drive axle, whereby the above-described advantages and further advantages result.

BRIEF DESCRIPTION OF THE DRAWINGS

Example aspects of the present invention are explained in greater detail in the following with reference to the drawings. Wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

In FIGS. 1 through 5, an electric drive axle is schematically represented, merely by way of example, with reference to two example embodiment variants, which are preferably independent of one another, each with additional further example embodiments.

Figure 1:
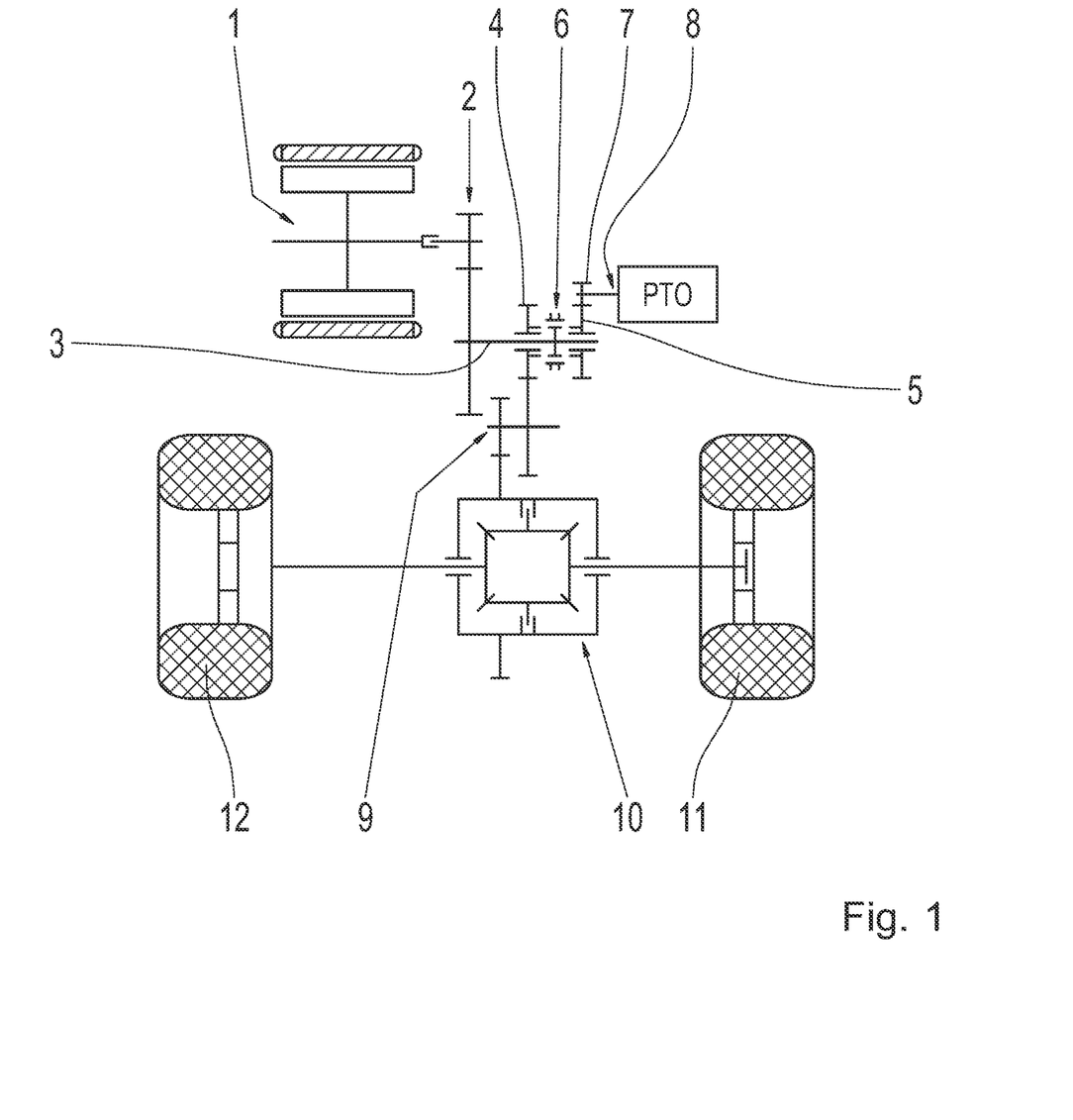
FIG. 1 shows a first example embodiment variant of an electric drive axle according to example aspects of the invention with a vehicle drive system and a double shift element for independently driving vehicle wheels and the power take-off.
Figure 2:
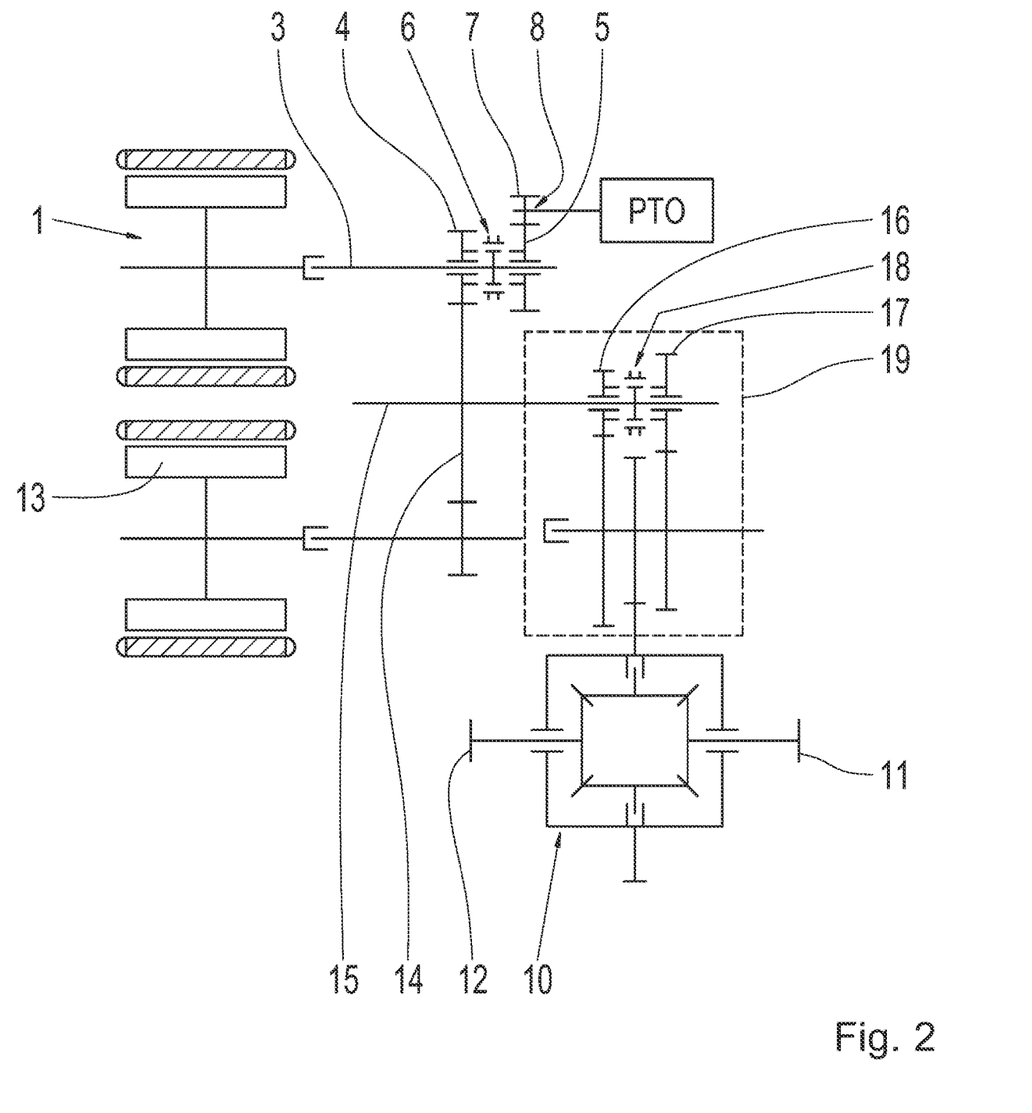
FIG. 2 shows one further example embodiment of the first example embodiment variant with two vehicle drive systems and an additional transmission gearing.
Figure 3:
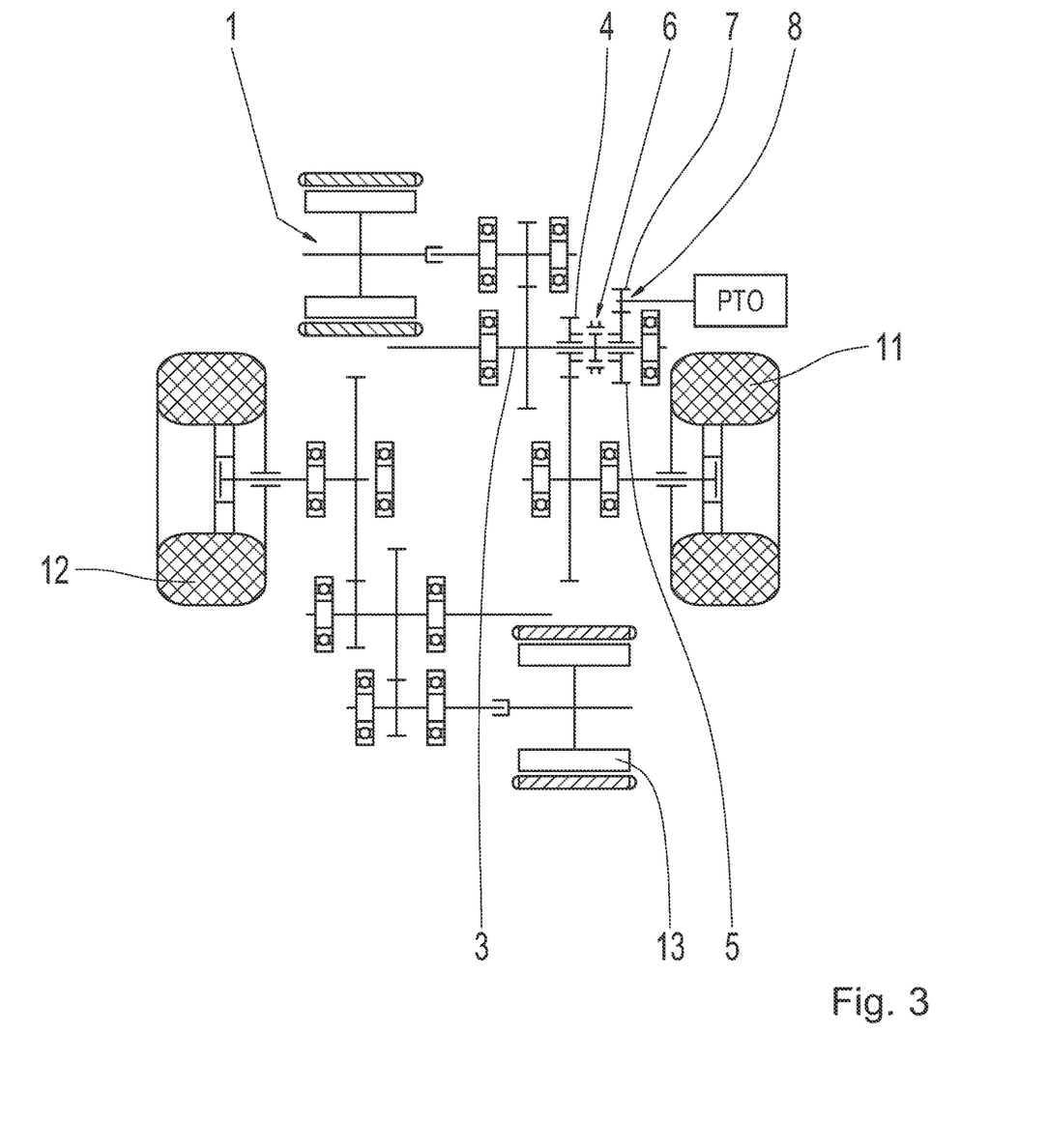
FIG. 3 shows one further example embodiment of the first example embodiment variant with two vehicle drive systems as a wheel-specific drive.

In FIGS. 1 through 3, various example embodiments of the first example embodiment variant of the electric drive axle for a vehicle are represented.

In FIG. 1, the drive axle includes a first vehicle drive system 1, which is coupled to an intermediate shaft 3 via a spur gear stage 2. A first idler gear 4 and a second idler gear 5 are associated with the intermediate shaft 3. The idler gears 4, 5 are engageable via a first double shift element 6 as, preferably, a constant-mesh shift element. The second idler gear 5 is engaged with one further gearwheel 7, which forms a connection interface 8 for a power take-off PTO. The first idler gear 4 is part of a further spur gear stage 9 of a countershaft design, which is coupled to a differential gear or an output differential 10 in order to drive a first vehicle wheel 11 and a second vehicle wheel 12.

In a first engagement position of the first double shift element 6, which, in FIG. 1, corresponds to a displacement of the double shift element 6 to the left, the first vehicle drive system 1 is connected to the spur gear stage 9 in order to drive the vehicle wheels 11, 12. In a second engagement position of the first double shift element 6, which, in FIG. 1, corresponds to a displacement of the double shift element 6 to the right, the first vehicle drive system 1 is decoupled from the vehicle wheels 11, 12 and coupled to the connection interface 8 in order to drive the power take-off PTO. In a neutral position of the first double shift element 6, the driven end and/or the vehicle wheels 11, 12 may be decoupled from the first vehicle drive system 1 and from the power take-off PTO, for example, in order to tow the vehicle. This towing function is particularly advantageous when permanent-magnet electric motors (PSM) are utilized as the vehicle drive system.

In FIG. 2, an alternative example embodiment of the first example embodiment variant according to FIG. 1 is represented. In contrast to FIG. 1, in the example embodiment of FIG. 2, a second vehicle drive system 13 is provided in addition to the first vehicle drive system 1. The first vehicle drive system 1 and the second vehicle drive system 13 are coupled to each other via a summing gear 14 in order to sum the drive power, wherein the first vehicle drive system 1 is coupleable to the summing gear 14 via the first engageable idler gear 4 on the intermediate shaft 3. Accordingly, as in the example embodiment according to FIG. 1, the first vehicle drive system 1, in the first engagement position of the first double shift element 6, is couplable to the second vehicle drive system 13 in order to jointly drive the vehicle wheels 11, 12, while, in the second engagement position of the first double shift element 6, the first vehicle drive system 1 is coupled to the input interface 8 in order to exclusively drive the power take-off PTO. In the second engagement position, the drive of the vehicle wheels therefore takes place exclusively via the second vehicle drive system 13.

In the example embodiment shown in FIG. 2 by way of example, the summing gear 14 is rotationally fixed on a further intermediate shaft 15, wherein the further intermediate shaft 15 includes a third idler gear 16 and a fourth idler gear 17, with which a second double shift element 18 is associated. In a first engagement position of the second double shift element 18, which, in FIG. 2, corresponds to a displacement of the second double shift element 18 to the left, the second vehicle drive system 13 and, if necessary, also the first vehicle drive system 1 is/are coupled via a first gear stage to the output differential 10 in order to drive the vehicle wheels 11, 12. Therefore, the engageable spur gear stages of a countershaft design, which are represented in a dashed-line box in FIG. 2, form an additional transmission gearing 19. If the second double shift element 18 is in the neutral position of the second double shift element 18, the towing function is advantageously implementable in the vehicle in the example embodiment of FIG. 2 as well.

In FIG. 3, one further example embodiment of the first example embodiment variant is represented by way of example, with reference to a wheel-specific drive. In the example embodiment of FIG. 3 as well, a first vehicle drive system 1 and a second vehicle drive system 13 are provided. In contrast to the example embodiment according to FIG. 2, the drive power is not summed within the vehicle, but rather is associated, wheel-specifically, to a vehicle wheel 11, 12, whereby the drive power is summed via the road. For this purpose, each vehicle drive system 1, 13 is coupled via spur gear stages of a countershaft design to the drive shaft of the vehicle wheel 11, 12, respectively. Just as with the example embodiment according to FIG. 1, associated with the intermediate shaft 3 of the first vehicle drive system 1 are the first idler gear 4 and the second idler gear 5, which are engageable via the first double shift element 6, in order to selectively couple the first vehicle drive system 1 either to the first vehicle wheel 11 or to the input interface 8 in order to drive the power take-off PTO.

Figure 4:
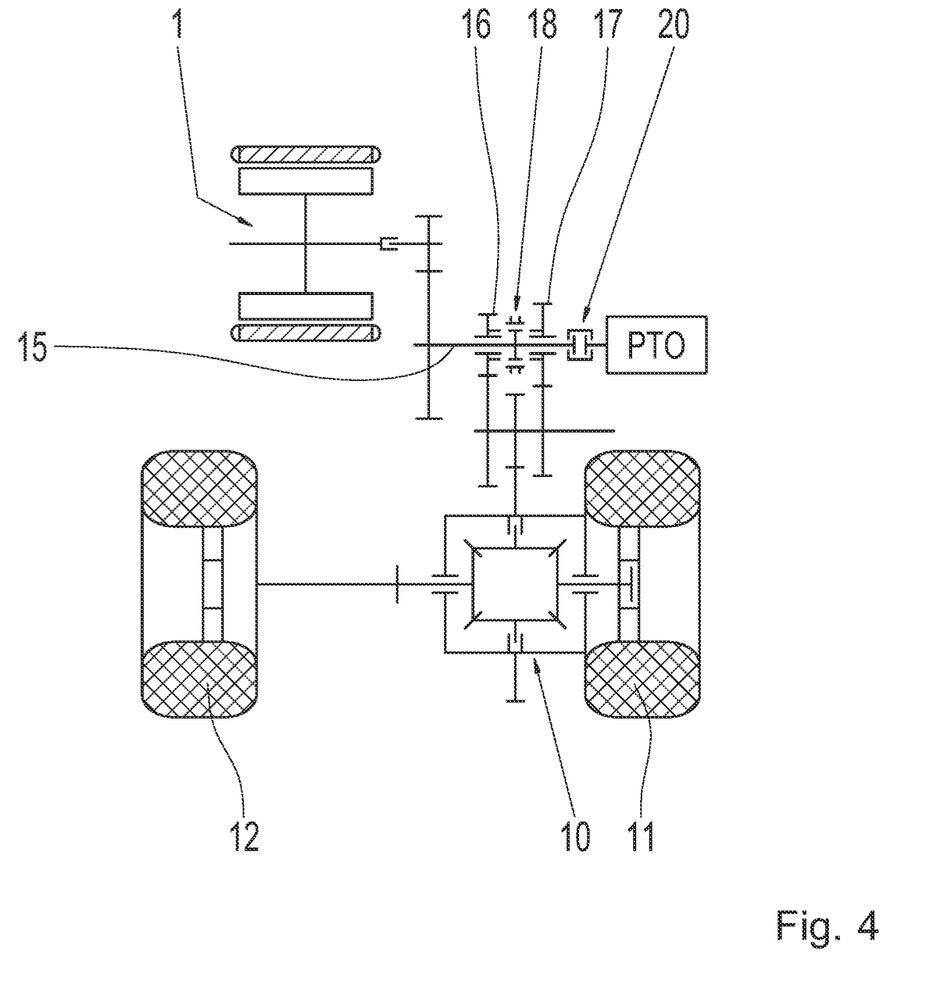
FIG. 4 shows a second example embodiment variant of the drive axle according to example aspects of the invention with a vehicle drive system with two engageable gear stages and an additionally engageable power take-off.

In FIG. 4, a second example embodiment variant of the electric drive axle is represented with only one first vehicle drive system 1. In this example embodiment variant, associated with the intermediate shaft 15 is the second double shift element 18, which engages the third idler gear 16 and the fourth idler gear 17 on the intermediate shaft 15. In contrast to the example embodiment according to FIG. 2, the intermediate shaft 15 is exclusively associated with the first vehicle drive system 1. The first vehicle drive system 1 is coupled via a first gear stage, in the first engagement position of the second double shift element 18, and via a second gear stage, in the second engagement position of the second double shift element 18, to the output differential 10 in order to drive the vehicle wheels 11, 12. Associated with the connection interface for the power take-off PTO is a single shift element 20, for example, as a shifting dog, with which the intermediate shaft 15 is drivingly coupled to the power take-off PTO. Therefore, in the engaged condition of the single shift element 20, the power take-off PTO is operable during travel and also in the neutral position of the second double shift element 18. Moreover, the towing function can be advantageously enabled in the neutral position of the second double shift element 18 with the single shift element 20 disengaged, since the first vehicle drive system 1 is decoupled from the vehicle wheels 11, 12 in the neutral position.

Figure 5:
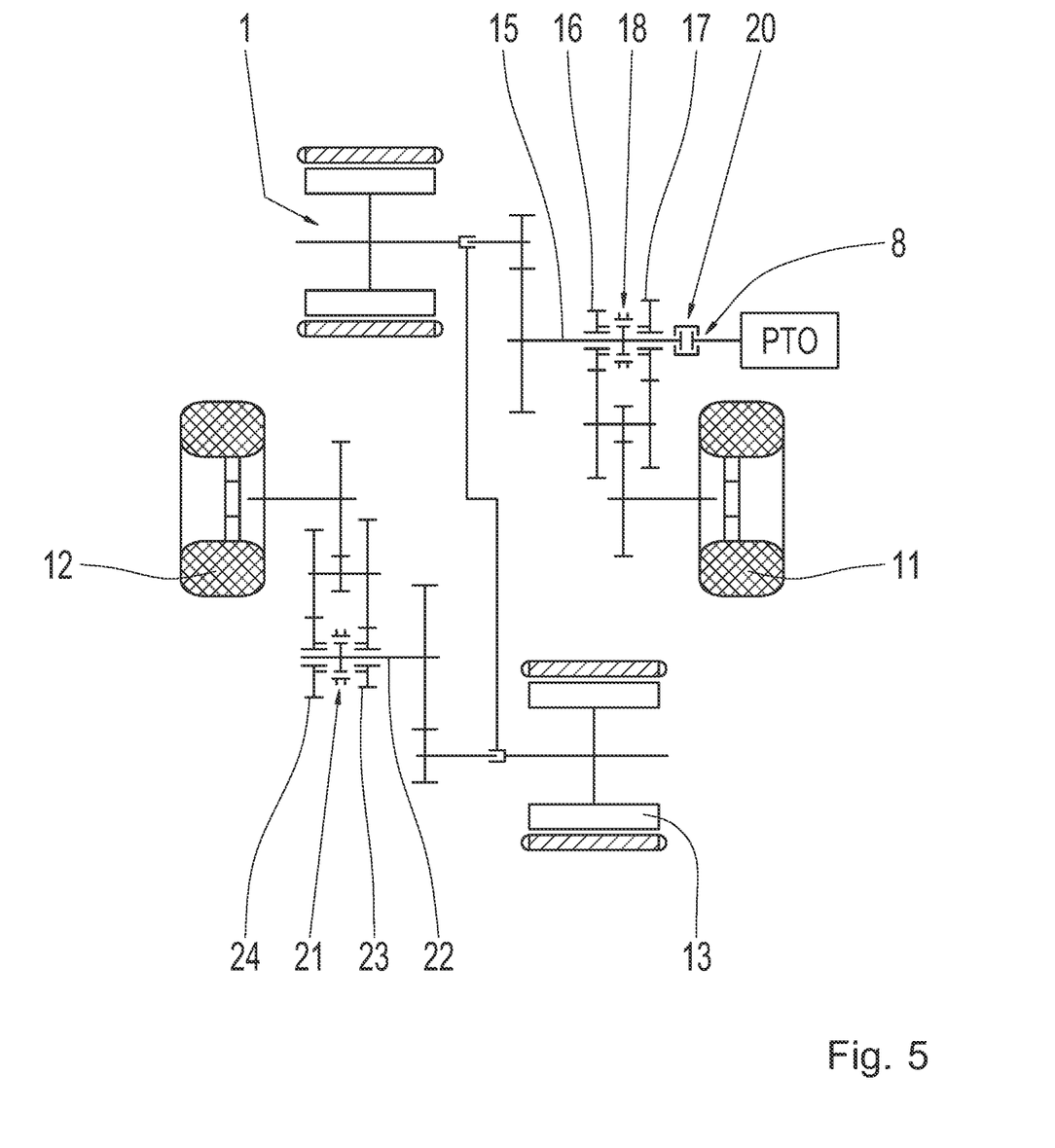
FIG. 5 shows one further example embodiment of the second example embodiment variant with two vehicle drive systems as a wheel-specific drive.

In FIG. 5, a further example embodiment of the second example embodiment variant is represented, in which, in contrast to FIG. 4, a wheel-specific drive is implemented. Accordingly, the first vehicle drive system 1 is coupleable via the third idler gear 16 or the fourth idler gear 17 to the drive shaft of the first vehicle wheel 11, while the second vehicle drive system 13 is coupleable via a third double shift element 21 similarly to the drive shaft of the second vehicle wheel 12. The third double shift element 21 is associated with an intermediate shaft 22, wherein a fifth idler gear 23 and a sixth idler gear 24 are arranged on the intermediate shaft 22 and are engageable via the third double shift element 21. In a first engagement position of the third double shift element 21, which, in FIG. 5, corresponds to a displacement of the third double shift element 21 to the right, the second vehicle drive system 13 is coupled via a first gear stage to the second vehicle wheel 12, while, in a second engagement position of the third double shift element 21, which, in FIG. 5, corresponds to a displacement of the third double shift element 21 to the left, the second vehicle drive system 13 is coupled via a second gear stage to the second vehicle wheel 12. In the specific representation according to FIG. 5, an additional connection point for a further power take-off PTO, which could be driven by the second vehicle drive system 13, is not represented. This can be implemented, however, by an additional single shift element in the same way as in the case of the first vehicle drive system 1.

Regardless of the particular example embodiment variants and example embodiments, axially parallel arrangements of vehicle drive systems 1, 13 and the vehicle wheels to be driven are represented by way of example, since this example embodiment allows for a particularly installation space-saving example embodiment of the electric drive axle. Other axle alignments, such as, for example, a coaxial arrangement, are also conceivable, however.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 first vehicle drive system
2 spur gear stage
3 intermediate shaft
4 first idler gear
5 second idler gear
6 first double shift element
7 gearwheel
8 connection interface
9 spur gear stage
10 differential gear or output differential
11 first vehicle wheel
12 second vehicle wheel
13 second vehicle drive system
14 summarizing gear
15 intermediate shaft
16 third idler gear
17 fourth idler gear
18 second double shift element
19 additional transmission gearing
20 single shift element
21 third double shift element
22 intermediate shaft
23 fifth idler gear
24 sixth idler gear
PTO power take-off

The invention claimed is:
1. An electric drive axle for a vehicle, comprising:
an electric vehicle drive system (1, 13) configured for driving at least one vehicle wheel (11, 12);
a double shift element (6); and
a connection interface (8) for a power take-off (PTO),
wherein the electric vehicle drive system (1, 13) is coupled to the double shift element (6) such that the electric vehicle drive system (1, 13) is drivingly coupled to the at least one vehicle wheel (11, 12) at least in a first engagement position of the double shift element (6) and such that the electric vehicle drive system (1, 13) is decoupled from the at least one vehicle wheel (11, 12) and is drivingly coupled to the connection interface (8) for the power take-off (PTO) in a second engagement position of the double shift element (6).

2. The electric drive axle of claim 1, wherein the electric vehicle drive system (1, 13) is decoupled from the at least one vehicle wheel (11, 12) and the power take-off (PTO) in a neutral position of the double shift element (6).

3. The electric drive axle of claim 1, further comprising a transmission gearing (19) connected downstream from the electric vehicle drive system (1, 13).

4. The electric drive axle of claim 3, wherein the transmission gearing (19) is configured to be engageable in order to implement multiple gear stages.

5. The electric drive axle of claim 3, wherein the double shift element (6) is a first double shift element, the electric drive axle further comprises a second double shift element (18), and the second double shift element (18) is associated with the transmission gearing (19) such that a first gear stage is engaged in a first engagement position of the second double shift element (18) and such that a second gear stage is engaged in a second engagement position of the second double shift element (18).

6. The electric drive axle of claim 1, wherein the electric vehicle drive system (1) is a first electric vehicle drive system, and the electric drive axle further comprises a second electric vehicle drive system (13).

7. The electric drive axle of claim 6, wherein the first vehicle drive system (1) and the second vehicle drive system (13) are coupled via a summing gear (14) that is configured to sum drive power of the first and second vehicle drive systems (1, 13), and the summing gear (14) is coupled to an output differential (10) via a transmission gearing (19) in order to drive the at least one vehicle wheel (11, 12).

8. A vehicle comprising the electric drive axle of claim 1, wherein the electric drive axle is operatively attached within the vehicle.

9. An electric drive axle for a vehicle, comprising:
an electric vehicle drive system (1, 13) for driving at least one vehicle wheel (11, 12);
a double shift element (18);
a connection interface (8) for a power take-off (PTO); and
a single shift element (20) for selectively coupling and decoupling the power take-off (PTO) to or from the vehicle drive system (1, 13), the single shift element (20) associated with the connection point (8) for the power take-off (PTO),
wherein the electric vehicle drive system (1) is coupled to the double shift element (18) such that a first gear stage is engaged for driving the at least one vehicle wheel (11, 12) in a first engagement position of the double shift element (18) and such that a second gear stage is engaged for driving the at least one vehicle wheel (11, 12) in a second engagement position of the double shift element (18).

10. The electric drive axle of claim 9, wherein the electric vehicle drive system (1, 13) is decoupled from the at least one vehicle wheel (11, 12) and the power take-off (PTO) in a neutral position of the double shift element (18).

11. The electric drive axle of claim 9, further comprising a transmission gearing (19) connected downstream from the electric vehicle drive system (1, 13).

12. The electric drive axle of claim 11, wherein the transmission gearing (19) is configured to be engageable in order to implement multiple gear stages.

13. The electric drive axle of claim 12, wherein the double shift element (18) is associated with the transmission gearing (19) such that the first gear stage is engaged with the transmission gearing (19) in the first engagement position of the double shift element (18) and such that the second gear stage is engaged with the transmission gearing (19) in the second engagement position of the double shift element (18).

14. The electric drive axle of claim 9, wherein the electric vehicle drive system (1) is a first electric vehicle drive system, and the electric drive axle further comprises a second electric vehicle drive system (13).

15. The electric drive axle of claim 14, wherein the first vehicle drive system (1) and the second vehicle drive system (13) are coupled via a summing gear (14) that is configured to sum drive power of the first and second vehicle drive systems (1, 13), and the summing gear (14) is coupled to an output differential (10) via the transmission gearing (19) in order to drive the at least one vehicle wheel (11, 12).

16. The electric drive axle of claim 15, wherein:
the double shift element (18) is a first double shift element;
the electric drive axle further comprises a second double shift element (21);
the first double shift element (18) is configured to drivingly couple the first vehicle drive system (1) to a first vehicle wheel (11) of the at least one vehicle wheel (11, 12) via two gear stages; and
the second double shift element (21) is configured to drivingly couple the second vehicle drive system (13) to a second vehicle wheel (12) of the at least one vehicle wheel (11, 12) via two gear stages.

17. A vehicle comprising the electric drive axle of claim 9, wherein the electric drive axle is operatively attached within the vehicle.

* * * * *